Figure 1:
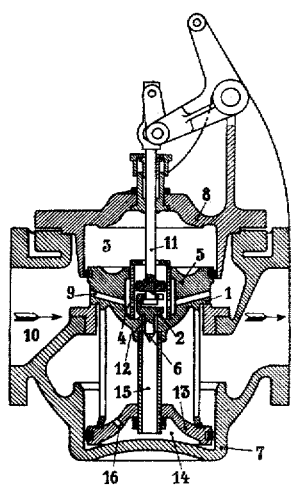

F. WAGNER.
FLUID PRESSURE ACTUATED VALVE.
APPLICATION FILED FEB. 2, 1912.

1,177,463.

Patented Mar. 28, 1916.
2 SHEETS—SHEET 1.

Inventor
Fritz Wagner by
Byrnes Townsend Brickenstein
Attys

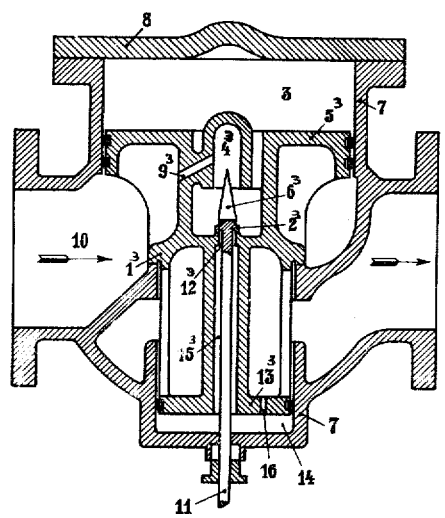
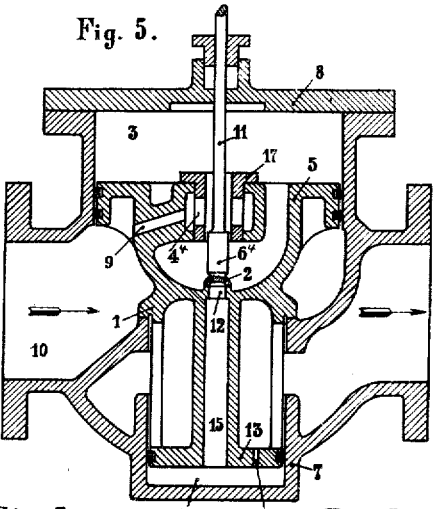
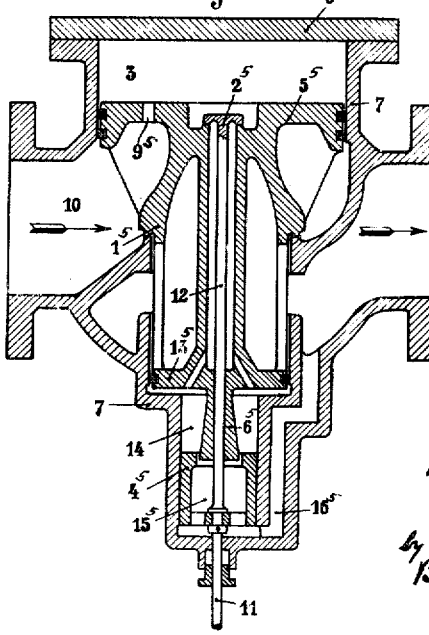

UNITED STATES PATENT OFFICE.

FRITZ WAGNER, OF GROSS-LICHTERFELDE, NEAR BERLIN, GERMANY.

FLUID-PRESSURE-ACTUATED VALVE.

1,177,463.  Specification of Letters Patent.  Patented Mar. 28, 1916.

Application filed February 2, 1912. Serial No. 675,058.

*To all whom it may concern:*

Be it known that I, FRITZ WAGNER, a citizen of the German Empire, residing at Gross-Lichterfelde, near Berlin, Germany, have invented certain new and useful Improvements in or Relating to Fluid-Pressure-Actuated Valves, of which the following is a specification.

The present invention relates to an improvement in or modification of the inventions described in my prior patent applications of October 26, 1908, Serial Number 459,665, and of Sept. 15, 1909, Serial Number 517,923, which matured into the respective Patents, 1,106,757, dated August 11, 1914, and No. 1,046,236, dated December 3, 1912. These patent applications describe means for preventing vibrations or chattering in automatically opening valves with equilibrium pistons. The means consist in the arrangement of a throttling body of gradually increasing cross-section of opening in the discharge or supply conduit of the equilibrium chamber. This throttling body fulfils two objects: 1, it allows the main valve to open only at the desired moment, and 2, it keeps the open main valve in any desired position of opening in a state of equilibrium, the throttling body equalizing then at once, in coöperation with the main valve, as a sensitive regulating valve, the changes of load or pressure acting on the main valve, thus avoiding vibrations of the valve.

The present invention relates to further constructions of valve for carrying out the object in question, which have proved advantageous for various special purposes. The new constructions are chiefly based on the fact that owing to the intermittent discharge of the pressure fluid a pressure which varies considerably, is produced on the outlet side of the main valve, which pressure acts of course always on the whole inner surface of the main valve. In that way under certain circumstances a powerful tendency to oscillate is exerted on the main valve floating in the pressure fluid, and before the throttling body can overcome this tendency there will necessarily result more or less considerable vibrations of the main valve. These vibrations or oscillations are however very unpleasant and disturbing in many cases.

To avoid the drawback in question, according to this invention, a relief or equilibrium chamber with its piston is arranged on the outlet side of the main valve. In this way, the area exposed to the actions of the changes of pressure produced by the intermittent escape of the pressure fluid on the outlet side of the valve, is reduced, as the said change of pressure acts both upwardly on the main valve, and downward on the relief piston, and consequently the area exposed to the action of the change of pressure, will be merely the difference of the two above mentioned areas, which need only be very small. In this way, the tendency of the main valve to vibrate is reduced.

The modification of the valve-constructions described in the patent-applications referred to therefore consists substantially in the equilibrium chamber of the main-valve, auxiliary valve and throttling body being located on the outlet side. This principle can be modified by arranging in addition to the relief chamber on the outlet side of the main valve with auxiliary valve and throttling body, another equilibrium chamber with a piston on the inlet side of the said main valve. In this way, the above mentioned "area of attack" or area exposed to the action of the change of pressure, could even be reduced to zero.

As to the prevention of the vibrations of the main valve, the same can be effected by regulating either the inlet or the outlet from the equilibrium chamber, as will be hereinafter described in detail.

Figure 2:
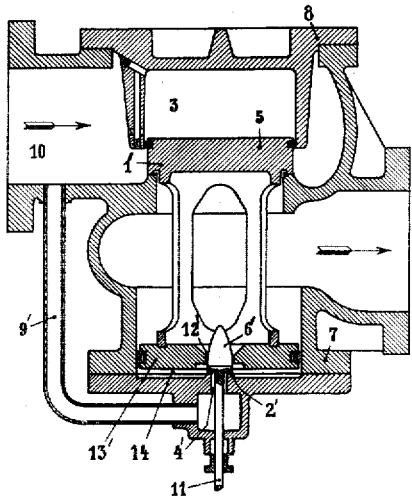
Figure 3:
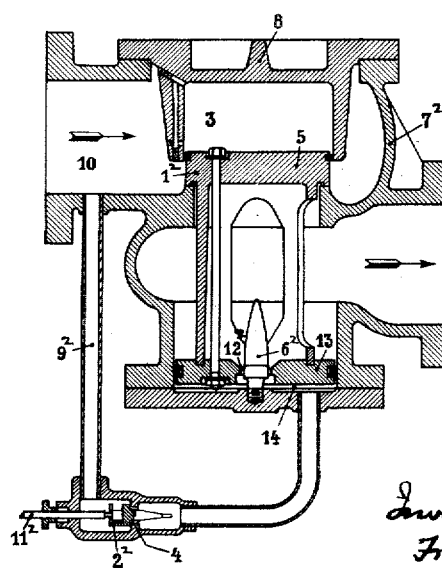

Figures 1 to 6 show sections of a few constructions according to this invention, without, however, exhausting the number of possible constructions, Figs. 1–3 showing valves in which but one equilibrium chamber, located at the outlet side, is arranged, whereas the constructions according to Figs. 4–6 have one equilibrium chamber on the inlet side and one equilibrium chamber on the outlet side. Figs. 5ª and 5ᵇ are details.

This applies more particularly to the throttling bodies illustrated which control the main valves, for it is obvious that, after their principle of working has been once ascertained they can be designed in various manners. Consequently, the invention comprises also other throttling devices, provided that in their coöperation with the main valve, they have the same action, such as that subsequently described for any of the throttling bodies illustrated.

In Fig. 1, the main valve 1 is connected to the piston 13 forming with the casing 7 the equilibrium chamber 14. The latter is connected to the pressure fluid inlet chamber 10 of the valve casing through conduits 9, 12, and 15 and has its discharge into the outlet chamber of the valve casing through the perforation 16. When the main valve is closed, the inlet for the pressure fluid to the chamber 14 is closed by the auxiliary valve 2, which can be moved by means of the spindle 11. To the auxiliary valve 2 is connected the throttling cone 6 arranged in the conduit 12. On the auxiliary valve 2 being opened, the cone 6 opens up a gradually increasing annular passage for the pressure fluid from the inlet chamber 10 into the equilibrium chamber 14. As the diameter of the latter is larger than the diameter of the main valve 1, the latter opens, after the opening of the auxiliary valve 2, as soon as, owing to the thus increasing annular passage more pressure fluid is admitted into the chamber 14 than can escape from the same through the perforation 16. As, however, on the main valve being opened, the pressure fluid at once finds access to the outlet side of the main valve, which up to that moment was shut off by the valve seat, the main valve is consequently driven against the cover 8 of the casing with a force corresponding to the pressure exerted by the fluid on the area of the outlet side of the main valve, which was rendered accessible to it at the opening. As, however, in that way, the main valve would again be brought nearer to the auxiliary valve, it is necessary, in order to prevent the main valve and the auxiliary valve striking against each other and the thereby resulting continuous "hammering" of the two valves, to retard the opening of the main valve until the auxiliary valve has been moved away from the main valve. The throttling cone must therefore provide for such a gradually increasing fluid passage that the auxiliary valve can be lifted a distance which is greater than the "compression stroke" of the main valve. By this "compression stroke" I wish to have understood that stroke or lift of the main valve which is necessary in order that the momentum thereof is absorbed by the gradually increased throttling of the flow of pressure fluid through the equilibrium chamber. By this throttling action, an increase or a like reduction of pressure, as the case may be, must occur in that chamber or chambers which act against the main valve and thereby limit its movement.

When the auxiliary valve is held fast in any opening position, the main valve not only stops before striking against the auxiliary valve, but automatically takes up such an open position relatively to the throttling cone, that through the annular passage thus produced, just as much pressure fluid is admitted into the equilibrium chamber 14, as constantly escapes from the latter through the perforation 16. In that open position, all the forces acting on the main valve, are equalized, and as long as the position of the auxiliary valve is not changed, the main valve will remain in the position of equilibrium once taken up, as the throttling cone acting as a sensitive regulating valve, in cooperation with the main valve always immediately equalizes all changes of load acting on the latter. If, however, the auxiliary valve is opened still farther, more pressure fluid will be admitted through the annular passage thus increased, into the equilibrium chamber, and the said fluid will continue to open the main valve until, owing to the increase of throttling thereby produced, the inlet and outlet of the equilibrium chamber have again become equal. A movement of the auxiliary valve in the opposite direction results, of course, in an opposite movement of the main valve. Once opened, the main valve will therefore follow every movement of the auxiliary valve, under the influence of the disturbance of equilibrium of the forces thus produced, as if it were mechanically secured to the said auxiliary valve.

The influence of the pressure changes produced by the intermittent discharge may further be reduced by providing the main valve 1 with a piston portion or extension 5 traveling in the braking cylinder 3, arranged in the cover 8 of the casing. As this cylinder is always in communication with the inlet chamber 10 by leakage around the piston, that is to say, it is always exposed to the full working pressure, it exercises a further powerful braking resistance on the vibration impulses that may be exerted on the main valve.

In many cases, it may be advantageous to connect the inlet chamber 10 by means of a separate auxiliary pipe to the relief or equilibrium chamber 14. Such an arrangement is shown in Fig. 2. Here the auxiliary valve 2' closes the inlet opening 4' of the auxiliary pipe or conduit 9', and the throttling cone 6', connected to the said auxiliary valve projects, through a cylindrical perforation 12', in the equilibrium piston 13', into the outlet chamber of the valve casing. When the auxiliary valve 2' is opened to a sufficient extent, the pressure fluid entering the chamber 14, lifts the main valve off its seat. During this opening movement however the annular outlet passage between the cone 6' and the perforation 12', is increased, and the opening of the main valve 1' continues therefore, when the auxiliary valve is held fast in any opening position, only until just as much pressure fluid begins to escape from the equilibrium chamber through the constantly increasing annular slot, as is constantly being admitted through the passage 4'. As soon as the main valve has reached that amount of lift, it is again in the position of equilibrium and each increase or reduction of the travel or lift of the auxiliary valve at once produces, owing to the destruction of equilibrium occasioned thereby an equal increase or reduction of the main valve lift.

For some purposes it is desirable not to operate the valve from the point at which it is mounted in the fluid pressure piping, but to operate it at a distance from any desired point of the auxiliary passage 9', without having to connect, the said point to the valve by means of complicated lever arrangements. To that end, as shown in the example in Fig. 3, the throttling cone $6^2$ is secured to the bottom of the valve casing $7^2$, and the auxiliary valve $2^2$ is arranged in the auxiliary passage $9^2$. To the auxiliary valve secured to the spindle $11^2$, is connected a throttling cone which on the auxiliary valve being opened uncovers for the pressure fluid a constantly increasing annular passage for the fluid from the inlet chamber 10 into the equilibrium chamber 14. When the admission into the latter exceeds the discharge from the same, the main valve $1^2$, is opened until the discharge from the chamber 14 through the thus increased annular passage between the cone $6^2$ and the cylindrical perforation $12^2$, again becomes equal to the admission into the same; each increase or reduction of the auxiliary valve lift resulting in a movement of the main valve of the same direction and value.

For the closing and regulating device for the passage of quantities of pressure fluid in the auxiliary pipe $9^2$, any other device which has the same action as that described can be employed.

As already mentioned in the introduction, the oscillation impulses exerted by the interchange of pressure produced by the intermittent discharge of the pressure fluid, on the outlet side of the main valve, can be reduced still further, even to zero, by arranging instead of one equilibrium chamber on one side of the main valve, one equilibrium chamber on each side of the main valve. A construction of the kind is illustrated in Figs. 4, 5 and 6.

In Fig. 4 the diameter of the bottom piston $13^3$ is equal to the inside diameter of the main valve $1^3$, so that the change of pressure produced on the outlet side of the main valve $1^3$, has no longer any extra "area of attack." For preserving automatic opening of the main valve $1^3$, it is therefore necessary to make the diameter of the second equilibrium piston $5^3$ larger than the diameter of the main valve. The two equilibrium chambers $3^3$ and 14 are connected together by the conduits or passages $12^3$ and $15^3$, and to the outlet side of the main valve $1^3$ by the perforation 16. When the main valve is closed, the said connection is interrupted by the auxiliary valve $2^3$ secured to the spindle $11^3$. To the auxiliary valve $2^3$ is connected the throttling cone $6^3$ which projects with its point into the hollow chamber $4^3$ into which opens the inlet conduit $9^3$ from the inlet chamber 10. The throttling cone $6^3$ in this arrangement controls therefore the inlet opening for the pressure fluid admitted from the chamber 10 into the chamber 3. On the auxiliary valve $2^3$ being opened, the said cone gradually reduces the cross-sectional area of the inlet passage, and as at the same time the equilibrium chamber $3^3$ is connected to the equilibrium chamber 14, and the pressure fluid from the latter escapes through the perforation 16, such a reduction and increase of the pressure in the two chambers 3 and 14 respectively will be finally produced when the auxiliary valve rises to a sufficient extent that the excess of pressure on the bottom face of the piston $5^3$, lifts the main valve off its seat. As already described with reference to Fig. 1, in order to avoid the two valves striking against each other, the opening of the main valve in this case, as well, must not take place until the distance of the auxiliary valve from the main valve has become greater than the compression travel of the latter. Once opened, the main valve takes up automatically the position of equilibrium in which, just as much pressure fluid enters the two equilibrium chambers through the annular slot thus produced between the wall of the hollow throttling cone $6^3$ and as escapes from them through chamber $4^3$, as escapes from them through the perforation 16. A further opening of the auxiliary valve produces, owing to the throttling of the inlet, thus produced, and the consequently increased reduction of pressure in the two equilibrium chambers, a further opening of the main valve, and vice versa. For the rest, the main valve is held fast again in any of its opening positions exactly as before by the coöperation of the throttling body with the main valve.

The valve shown in Fig. 5, differs from that shown in Fig. 4, essentially only as regards a different shape of the throttling body. The latter consists in this example of a cylinder $6^4$ traveling in a gland 17 provided with perforations or openings 4. These perforations can be of different shape, for instance triangular, as the perforations $4^{41}$ in the development of the gland 17 shown in Fig. $5^a$, or rectangular, as the perforations $4^{42}$ in Fig. $5^b$, provided that they perform in coöperation with the cylinder 6, the same throttling action as that described for the cones $6^4$ or $6^3$ with reference to Figs. 1 and 4. Fig. 5 affords at the same time an example showing that the invention is by no means limited to any construction of the throttling body illustrated, but extends to any other throttling bodies having the same action as that described.

For certain purposes, in the case of valves with two equilibrium chambers, it may be preferable instead of making the outlet opening of the chambers constant, as just described, and consequently regulating the quantity of pressure fluid admitted by means of a throttling body, to make the inlet openings for the pressure fluid constant and to regulate its discharge by means of a throttling body. Such a modification of the invention is illustrated in the construction shown in Fig. 6. In this case, the main valve $1^5$ is connected to the two equilibrium pistons $5^5$ and $13^5$ forming together with the casing $7^5$, the two equilibrium chambers 3 and 14. When the auxiliary valve $2^5$ is opened both chambers are connected together by means of the conduit $12^5$. To the lower equilibrium piston $13^5$ is connected a throttling cone $6^5$ in such manner that its wide lower end projects into a cylinder $4^5$ secured to the spindle $11^5$ of the valve $2^5$. When, for the purpose of opening the main valve, the auxiliary valve $2^5$ is lifted off its seat, and the connection between the two chambers 3 and 14 is thus established, the cylinder $4^5$ is at the same time moved upward and produces an annular passage around the cone $6^5$, which increases with the travel of the auxiliary valve, for the discharge of the pressure fluid from the two equilibrium chambers through the hollow part $15^5$ of the cylinder 4 and the conduit $16^5$, into the outlet chamber of the valve casing. The cone $6^5$ is of such construction that the cylinder $4^5$ when moved upward during the opening of the auxiliary valve $2^5$, will uncover a discharge passage exceeding in cross-section that of the perforation $9^5$, and thus bring about the opening of the main valve only when the distance of the auxiliary valve $2^5$ from the main valve $1^5$, has become greater than the compression travel of the subsequently opening main valve. In that way, a striking or hammering of the two valves against each other is prevented, and the opened main valve is held in the desired open position exactly in the same way as before, by the coöperation of the throttling cone $6^5$ with the cylinder $4^5$, and is further opened or closed by further raising or lowering the cylinder $4^5$.

With reference to Figs. 1, 2 and 4 to 6 it must be pointed out that, without departing from the spirit of the invention, the auxiliary valve 2 can be done away with or replaced by some other construction, so that only the throttling valve will remain. Of course, this can be done in every case in which it is not essential to insure a perfect closing by means of an auxiliary part when the main valve is closed.

Having now particularly described the nature of my said invention and in what manner the same is to be performed, I declare that what I claim is:—

1. A fluid-pressure control valve, comprising a casing having inlet- and outlet-passages and a main valve between these passages, two piston-cylinders one of which is located on the inlet side and the other of which is located on the outlet side of the main valve, pistons in these cylinders connected to the main valve, each piston cylinder being in open communication on one side of its piston with its respective passage, the inlet piston-cylinder comprising a braking chamber to the rear of its piston, and the outlet piston-cylinder comprising an equilibrium chamber to the rear of its piston, means admitting pressure-fluid to the braking chamber, a fluid-passage to admit pressure-fluid direct from the inlet-passage to the equilibrium chamber, means connecting the equilibrium chamber with the outlet-passage, an auxiliary valve in said fluid-passage to control the admission of pressure-fluid to the equilibrium chamber to automatically raise the main valve, and a throttling member secured to said auxiliary valve for regulating the flow of pressure-fluid.

2. A fluid-pressure control valve, comprising a casing having inlet- and outlet-passages and a main valve between these passages, two piston-cylinders one of which is located on the inlet side and the other of which is located on the outlet side of the main valve, pistons in these cylinders connected to the main valve, each piston-cylinder being in open communication on one side of its piston with its respective passage, the inlet-piston-cylinder comprising a braking chamber to the rear of its piston, and the outlet piston-cylinder comprising an equilibrium chamber to the rear of its piston, a fluid passage for connecting the said chambers with each other, a duct connecting the inlet passage with said fluid passage, a valve for said fluid passage to control the admission of pressure-fluid to the equilibrium chamber to automatically raise the main valve, a throttling element secured to said valve, said throttling element arranged to regulate the supply of pressure-fluid through said duct.

3. A fluid-pressure control valve, comprising a casing having inlet- and outlet-passages, and a main valve between these passages, two piston cylinders one of which is located on the inlet side and the other of which is located on the outlet side of the main valve, pistons in these cylinders connected to the main valve, each piston cylinder being in open communication on one side of its piston with its respective passage, the inlet piston-cylinder comprising a braking chamber to the rear of its piston, and the outlet piston cylinder comprising an equilibrium chamber to the rear of its piston, a fluid passage for connecting the said chambers with each other, means connecting the equilibrium chamber with the outlet passage, means including a throttle chamber for a permanent fluid-connection between the braking chamber and the inlet passage, a reciprocating auxiliary valve controlling said fluid passage and a throttling member connected to said auxiliary valve and coöperating with said throttle-chamber, said auxiliary valve coöperating with the throttle member for regulating the flow of pressure-fluid through the fluid passage to thereby vary the position of the main valve.

4. A fluid-pressure control valve comprising a casing having inlet- and outlet-passages, and a main valve between these passages, two piston cylinders one of which is located on the inlet side and the other of which is located on the outlet side of the main valve, the inlet piston-cylinder being of greater diameter than the outlet piston-cylinder, pistons in these cylinders connected to the main valve, each piston cylinder being in open communication on one side of its piston with its respective passage, the inlet piston-cylinder comprising a braking-chamber to the rear of its piston, and the outlet piston-cylinder comprising an equilibrium chamber to the rear of its piston, a fluid passage for connecting the chambers with each other, means connecting the equilibrium chamber with the outlet passage, means for admitting pressure-fluid to each of said chambers through said fluid passage, and reciprocating throttling means for regulating the flow of pressure-fluid into one of said chambers.

5. A fluid-pressure control valve, comprising a casing having inlet- and outlet-passages and a main valve between these passages, two piston cylinders one of which is located on the inlet side and the other of which is located on the outlet side of the main valve, the inlet piston-cylinder being of greater diameter than the outlet piston-cylinder and the diameter of the outlet piston-cylinder being equal to the effective diameter of the main valve, pistons in these cylinders connected to the main valve, each piston-cylinder being in open communication on one side of its piston with its respective passage, the inlet piston-cylinder comprising a braking chamber to the rear of its piston, and the outlet piston-cylinder comprising an equilibrium chamber to the rear of its piston, a fluid passage for connecting the chambers with each other, means connecting the equilibrium chamber with the outlet-passage, a duct for admitting pressure-fluid to said fluid passage, and reciprocating throttling means controlling said duct for regulating the flow of pressure-fluid into said fluid-passage.

In testimony whereof I affix my signature in presence of two witnesses.

FRITZ WAGNER.

Witnesses:
 HENRY HASPER,
 WOLDEMAR HAUPT.

It is hereby certified that in Letters Patent No. 1,177,463, granted March 28, 1916, upon the application of Fritz Wagner, of Gross-Lichterfelde, near Berlin, Germany, for an improvement in "Fluid-Pressure-Actuated Valves," errors appear in the printed specification requiring correction as follows: Page 3, lines 65 and 82, for the reference-numeral "$3^3$" read $3$; same page, line 71, for "$11^3$" read $11$; same page, line 121, for "4" read $4^4$; same page, line 127, for "6" read $6^4$, and line 129, for "$6^4$" read $6$; page 4, line 27, for the reference-numeral "$11^5$" read $11$; same page, line 38, for "4" read $4^5$; and that the said Letters Patent should be read with these corrections therein that the same may conform to the record of the case in the Patent Office.

Signed and sealed this 17th day of July, A. D., 1917.

[SEAL.]

F. W. H. CLAY.
*Acting Commissioner of Patents.*

Cl. 137—4.